US012110022B2

United States Patent
Salter et al.

(10) Patent No.: US 12,110,022 B2
(45) Date of Patent: Oct. 8, 2024

(54) REMOTE PARKING CONTROL FOR VEHICLES COUPLED IN A TOWED RECHARGING ARRANGEMENT

(71) Applicant: FORD GLOBAL TECHNOLOGIES, LLC, Dearborn, MI (US)

(72) Inventors: Stuart C. Salter, White Lake, MI (US); Kenneth P. McHugh, Canton, MI (US); Peter Phung, Windsor (CA); Erick M. Lavoie, Van Buren Charter Township, MI (US); Hamid Golgiri, Livonia, MI (US); John R. Van Wiemeersch, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 416 days.

(21) Appl. No.: 17/359,951

(22) Filed: Jun. 28, 2021

(65) Prior Publication Data

US 2022/0410895 A1 Dec. 29, 2022

(51) Int. Cl.
*B60W 30/16* (2020.01)
*B60L 53/36* (2019.01)
(Continued)

(52) U.S. Cl.
CPC ............. *B60W 30/16* (2013.01); *B60L 53/36* (2019.02); *B60L 53/68* (2019.02); *G05D 1/0016* (2013.01); *G05D 1/0038* (2013.01); *G06F 3/04817* (2013.01); *G06F 3/0488* (2013.01); *H04W 4/40* (2018.02)

(58) Field of Classification Search
CPC . B62D 15/0285; B60W 30/16; B60W 30/165; B60W 30/06; B60L 53/00; B60L 53/68; H04M 1/724098; B60Y 2300/06
See application file for complete search history.

(56) References Cited

U.S. PATENT DOCUMENTS 9,527,394 B1 * 12/2016 Tang ..................... B60W 10/26
10,747,218 B2 8/2020 Lavoie et al.
(Continued)

FOREIGN PATENT DOCUMENTS

DE 102016214433 A1 2/2018

*Primary Examiner* — Todd Melton
*Assistant Examiner* — Vincent Feng
(74) *Attorney, Agent, or Firm* — Frank L. Lollo; MacMillan, Sobanski & Todd, LLC

(57) ABSTRACT

Electrified vehicles are coupled together by a towing device for in-flight energy transfer. A remote-controlled parking system collects images from vehicle-mounted cameras to produce a 360° overhead live streaming image that is displayed on a smartphone linked to a vehicle controller. A user interface (UI) on the smartphone accepts a first touch from the user on the streaming image showing the vehicles at a starting position in order to specify a maneuver endpoint. The controller calculates a sequence of steering actions to create a path to the endpoint. The UI displays the calculate path as an overlay on the live image. The UI generates an activation signal in response to a second touch input on the touchscreen, and forwards the activation signal to the vehicle controller during the second touch input to move the vehicles according to the actuator commands only while the user maintains the second touch input.

20 Claims, 6 Drawing Sheets

(51) Int. Cl.
  *B60L 53/68*      (2019.01)
  *G05D 1/00*       (2024.01)
  *G06F 3/04817*    (2022.01)
  *G06F 3/0488*     (2022.01)
  *H04W 4/40*       (2018.01)

(56) References Cited

U.S. PATENT DOCUMENTS

| | | |
|---|---|---|
| 10,908,603 B2 | 2/2021 | Golgiri et al. |
| 10,976,733 B2 | 4/2021 | Lavoie et al. |
| 2014/0188699 A1* | 7/2014 | Langgood ............... B60L 58/12 701/1 |
| 2015/0051795 A1* | 2/2015 | Keys, II .......... B60W 30/18036 701/41 |
| 2018/0354554 A1* | 12/2018 | Mahabadi ............... B62D 13/06 |
| 2019/0100245 A1* | 4/2019 | Fukushima ............. B62D 13/06 |
| 2020/0122716 A1 | 4/2020 | Matuk et al. |
| 2020/0148196 A1 | 5/2020 | Lim |
| 2020/0341472 A1 | 10/2020 | Zenner et al. |
| 2021/0170817 A1* | 6/2021 | Smith .................... B60D 1/465 |
| 2022/0161853 A1* | 5/2022 | Ramirez Llanos .. G06V 20/586 |
| 2022/0363157 A1* | 11/2022 | Nakagawa ........ B60W 60/0023 |
| 2022/0382275 A1* | 12/2022 | Martin ................ G06F 3/04847 |

* cited by examiner

REMOTE PARKING CONTROL FOR VEHICLES COUPLED IN A TOWED RECHARGING ARRANGEMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle-to-vehicle energy transfer for charging a battery of an electrified vehicle, and, more specifically, to automated, remote control for remote parking of vehicles coupled together for vehicle-to-vehicle energy transfer.

Electrified vehicles, such as a battery electric vehicle (BEV), typically contain a rechargeable battery pack to deliver power to one or more traction motors. The traction motors can propel the electrified vehicles instead of, or in combination with, an internal combustion engine. Plug-in type electrified vehicles include one or more charging interfaces (wireless, inductive charging or direct connection) for charging the battery pack. Plug-in type electrified vehicles are usually charged while being parked at a charging station or some other utility power source.

The need to be plugged in at a charging station may require the electrified vehicle to remain stationary for lengthy periods of time. When undertaking a trip exceeding the charge capacity of the battery pack, a traveler may be delayed by the need for a recharge. To reduce or avoid such delays, vehicle-to-vehicle in-flight energy transfer systems can be used in which vehicles are coupled together (e.g., in a towing relationship) in order to move together as a unit while electrical energy supplied by one of the vehicles is used to recharge a battery pack in the other vehicle.

Energy may be transferred from a towing or leading vehicle to a towed or trailing vehicle, from the trailing vehicle to the leading vehicle, or in both directions during the in-flight energy transfer events. Systems may be provided to coordinate the terms and conditions of a service agreement between the leading and trailing vehicles, to coordinate the publication of a service experience rating from a user of the leading or trailing vehicle, and to coordinate the termination of the in-flight charging event by either user.

While a leading vehicle is towing a trailing vehicle, the driving task may be conducted using the leading vehicle to steer and to generate propulsion to advance both vehicles. As disclosed in pending U.S. patent application Ser. No. 17/224,165, filed Apr. 7, 2021, which is incorporated herein by reference in its entirety, electronic communication between vehicles may enable the leading vehicle to request the trailing vehicle to activate its drive system to generate assistive torque for increasing acceleration of the coupled vehicles.

A towing event may be primarily comprised of driving the coupled vehicles forward toward a destination. During forward movement, steering the vehicles using the leading vehicle is relatively straightforward. However, when a destination or waypoint is reached, it may be desired to park the coupled vehicles in a particular location by forward or reverse travel at slow speed (e.g., pulling into a parking space for uncoupling the vehicles). In particular, backing up while towing can be difficult because of interactions between the steering angles of the vehicles, poor visibility, lack of experience, and other factors. Imperfect steering during backup can result in uneven tire wear, waste of energy, collision with other objects, or the vehicles becoming stuck in a jackknifed condition.

Electrified vehicles of the type having the capabilities for in-flight charging may typically include a suite of external sensors such as cameras, radar, LiDAR, and/or ultrasonic sensors. Functional roles of the leading and trailing vehicle in conducting automated maneuvers may be tailored to the sensor and actuator capabilities of vehicles. Each vehicle may be used for one or more of propulsion, braking, and steering actions in order to move the vehicles to a desired location (e.g., in a reverse parking maneuver). While the vehicles may be capable of performing highly complex parking maneuvers, users may have a difficult time orchestrating such maneuvers (e.g., reversing into or out from a parking space). Furthermore, their confidence in performing such maneuvers may falter if they are not able to fully monitor progress of the vehicles and the clearance distances to nearby objects.

SUMMARY OF THE INVENTION

In one aspect of the invention, a remote-controlled vehicle interface system comprises a vehicle controller configured to collect a plurality of captured images from a plurality of cameras disposed in a pair of electrified vehicles coupled together by a towing device for in-flight energy transfer. The controller calculates a sequence of steering actions to be executed by both electrified vehicles to follow a path for maneuvering from a starting position to an endpoint, and generates vehicle actuator commands for both vehicles to automatically navigate the vehicles along the path in response to a manual activation signal from a user. A mobile device is linked wirelessly to the controller and includes a touchscreen display for presenting a user interface to the user. The user interface displays a live streaming image on the touchscreen display having a 360° overhead perspective. The user interface accepts a first manual touch input from the user on the streaming image while the vehicles are at the starting position in order to specify the endpoint. The user interface displays the path calculated by the vehicle controller as a path overlay on the live streaming image. The user interface generates the manual activation signal in response to a second manual touch input on the touchscreen, and forwards the manual activation signal to the vehicle controller only during the second manual touch input in order to move the vehicles according to the vehicle actuator commands while the user maintains the second manual touch input.

DETAILED DESCRIPTION OF PREFERRED EMBODIMENTS

Figure 1:
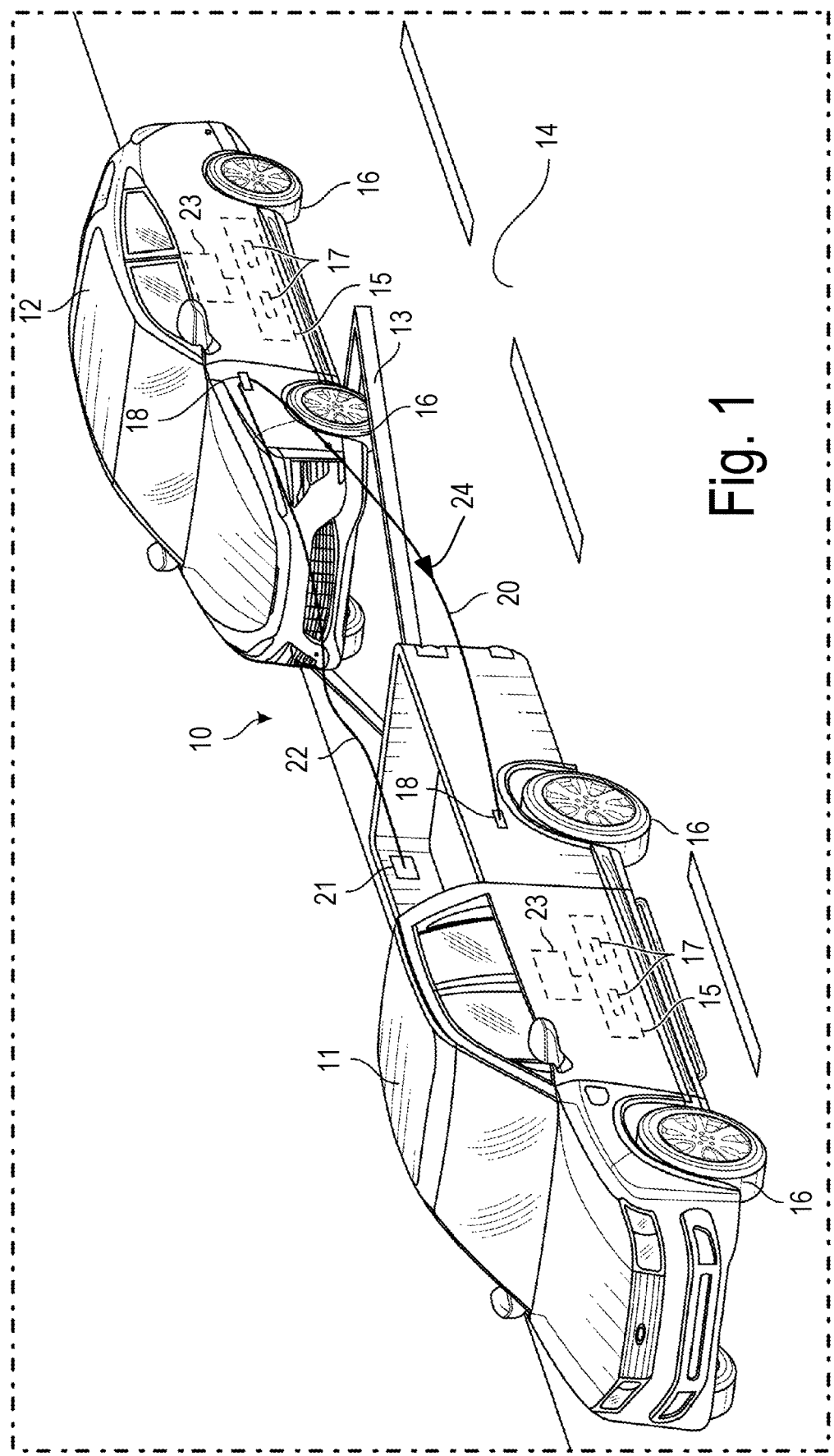
FIG. 1 is a perspective view of leading and trailing vehicles coupled together for in-flight charging.

FIG. 1 schematically illustrates an exemplary vehicle-to-vehicle (V2V) in-flight energy transfer system 10 for transferring energy in either direction between a towing or leading vehicle 11 and a towed or trailing vehicle 12 during a towing event. The term "in-flight" refers to coupled movement of leading vehicle 11 and trailing vehicle 12. Accordingly, system 10 enables the bidirectional transfer of energy from the leading vehicle 11 to the trailing vehicle 12 or vice-versa while the leading and trailing vehicles 11, 12 are making forward progress toward their desired destinations.

In-flight energy transfer may be beneficial to both participating parties. For example, the user/owner of the trailing vehicle 12 may take advantage of the time while being towed by resting, sleeping, eating, working, etc., and the user/owner of the leading vehicle 11 may generate income for performing the towing/charging task (e.g., as a revenue opportunity).

A towing device 13 may releasably couple trailing vehicle 12 with leading vehicle 11 to allow leading vehicle 11 to pull trailing vehicle 12 along a roadway 14 and thus control driving of the trailing vehicle 12 during a towing event. Towing device 13 could by any type of towing device (e.g., a towing tray) adapted to provide appropriate mechanical and/or electrical coupling. Accordingly, a specific configuration of towing device 13 is not intended to limit this disclosure. In cases where the power connection necessitates a towing tray be closest to the charge port but the drive wheels (of the trailing vehicle) are not on the towing tray but rather on the ground, the transmission of the trailing vehicle would be set to neutral and appropriate systems would be activated to protect the powertrain. In some embodiments, the trailing vehicle may be an autonomous (self-driving) vehicle, and the "towing" interconnection may be configured to provide electrical cables for power delivery and/or communication without a mechanical connection for physically propelling one vehicle from the other (i.e., the tandem arrangement would be only for power delivery). In such a situation, the autonomous trailing vehicle handles its own steering, braking, and acceleration.

In an embodiment, leading vehicle 11 and trailing vehicle 12 are both plug-in type electrified vehicles (e.g., a plug-in hybrid electric vehicle (PHEV) or a battery electric vehicle (BEV)). Each of leading and trailing vehicles 11, 12 includes a traction battery pack 15. Leading vehicle 11 and trailing vehicle 12 may each include an electrified powertrain capable of applying a propulsive torque from an electric machine (e.g., an electric motor) for driving drive wheels 16 of leading and trailing vehicles 11, 12. Therefore, the powertrain of each of leading vehicle 11 and trailing vehicle 12 may electrically propel the respective set of drive wheels 16 either with or without the assistance of an internal combustion engine. In some embodiments, only the vehicle receiving energy to recharge a battery pack is an electrified vehicle (e.g., a vehicle delivering electrical energy to the electrified vehicle may use a different type of propulsion, such as an internal combustion engine, while also having means for supplying the electrical energy to be transferred).

Traction battery packs 15 may be configured as a high voltage traction battery pack that includes a plurality of battery arrays 17 (i.e., battery assemblies or groupings of battery cells) capable of outputting electrical power to one or more electric machines of each vehicle. Other types of energy storage devices and/or output devices may also be used to electrically power each of leading vehicle 11 and trailing vehicle 12. From time to time, charging the energy storage devices of traction battery pack 16 may be required or desirable. Each of leading and trailing vehicles 11, 12 may therefore be equipped with a charging system that includes a charge port assembly 18. A charge cable 20 (e.g., Electric Vehicle Supply Equipment or EVSE) may be connected to the corresponding charge port assemblies 18 of leading and trailing vehicles 11, 12 in order to transfer charge energy between traction battery packs 16 (e.g., from leading vehicle 11 to trailing vehicle 12 or from trailing vehicle 12 to leading vehicle 11). Charge cable 20 may be configured to provide any level of charging (e.g., Level 1 AC charging, Level 2 AC charging, DC charging, etc.).

A charging system of leading vehicle 11 may optionally be equipped with a secondary charge port assembly 21. In an embodiment, secondary charge port assembly 28 is mounted within a cargo space of leading vehicle 11 for providing access to a power source at an external location of the leading vehicle 11. A charge cable 22 may be connected between secondary charge port assembly 21 and charge port assembly 18 of trailing vehicle 12 in order to transfer charge energy. Charge cable 22 may be configured to provide Level 1 or Level 2 AC charging, for example. In another embodiment, energy can be transferred between leading and trailing vehicles 11, 12 using both charge cable 20 and charge cable 22. Although not specifically shown, leading vehicle 11 and/or the trailing vehicle 12 could be equipped with one or more additional charging interfaces. Further, towing leading vehicle 11 may have a portable power back in the cargo bed which is not part of vehicle 11 which may be used as the power source for trailing vehicle 12.

Respective charging systems of leading and trailing vehicles 11, 12 may additionally include a bidirectional power transfer system 23 configured for enabling the bidirectional transfer of power between the vehicles 11, 12. Bidirectional power transfer system 23 may be operably connected between a respective charge port assembly 18 and a respective traction battery pack 15 of each of leading vehicle 11 and trailing vehicle 12. Bidirectional power transfer system 23 may include various equipment, such as a charger, a converter, and/or a motor controller (which may be referred to as an inverter system controller or ISC). Bidirectional power transfer systems 23 may additionally be configured to transfer energy between traction battery packs 15 and electric machines (e.g., traction motors) of each respective vehicle.

One non-limiting example of a suitable bidirectional power transfer system that may be employed for use within leading vehicle 11 and/or trailing vehicle 12 for achieving bidirectional power transfer is disclosed within US Patent Publication No. 2020/0324665, assigned to Ford Global Technologies, LLC, the disclosure of which is herein incorporated by reference. However, other bidirectional power transfer systems could also be utilized for achieving the bidirectional transfer of power between leading and trailing vehicles 11, 12 within the scope of this disclosure.

FIG. 1 schematically illustrates an in-flight configuration wherein power may be transferred from traction battery pack 15 of leading vehicle 11 to traction battery pack 15 of trailing vehicle 12 (as schematically depicted by an arrow 24). Alternatively, power may be transferred from traction battery pack 15 of trailing vehicle 12 to traction battery pack 15 of leading vehicle 11 (e.g., so that trailing vehicle 12 may transfer an electrical charge to leading vehicle 11 during the in-flight towing and charging event to be used to increase the towing distance that leading vehicle 11 is capable of towing trailing vehicle 12). In either case, leading vehicle 11 provides the main propulsion for moving the coupled vehicles forward, and driving is under control of the driver of leading vehicle 11.

While driving the vehicles in a towing arrangement, it may be desired to move in a reverse direction (referred to herein as a reverse parking maneuver in which the trailing vehicle leads the leading vehicle) such as moving into or out of a parking space. Backing up while towing a trailer can be difficult to perform due to limitations of maneuverability and visibility, for example. The invention provides backup assistance that takes advantage of capabilities of both vehicles in a cooperative manner to obtain many benefits such as reduced tire wear, more efficient energy usage from reduced friction, extended turning radius, and ease of control (e.g., added stability and visibility). One of the vehicles (e.g., the trailing vehicle which goes first for the reverse maneuver) may have steering, braking, and throttle actions determined using known techniques which have been developed for autonomous (e.g., self-driving) vehicles. The other vehicle (e.g., the leading vehicle) may execute steering, braking, and throttle actions determined using techniques as described in co-pending application U.S. Ser. No. 17/359,898, filed Jun. 28, 2021, entitled "Assisted Parking Maneuvers For Vehicles Coupled In A Towed Recharging Arrangement," which is incorporated herein by reference in its entirety.

Figure 2:
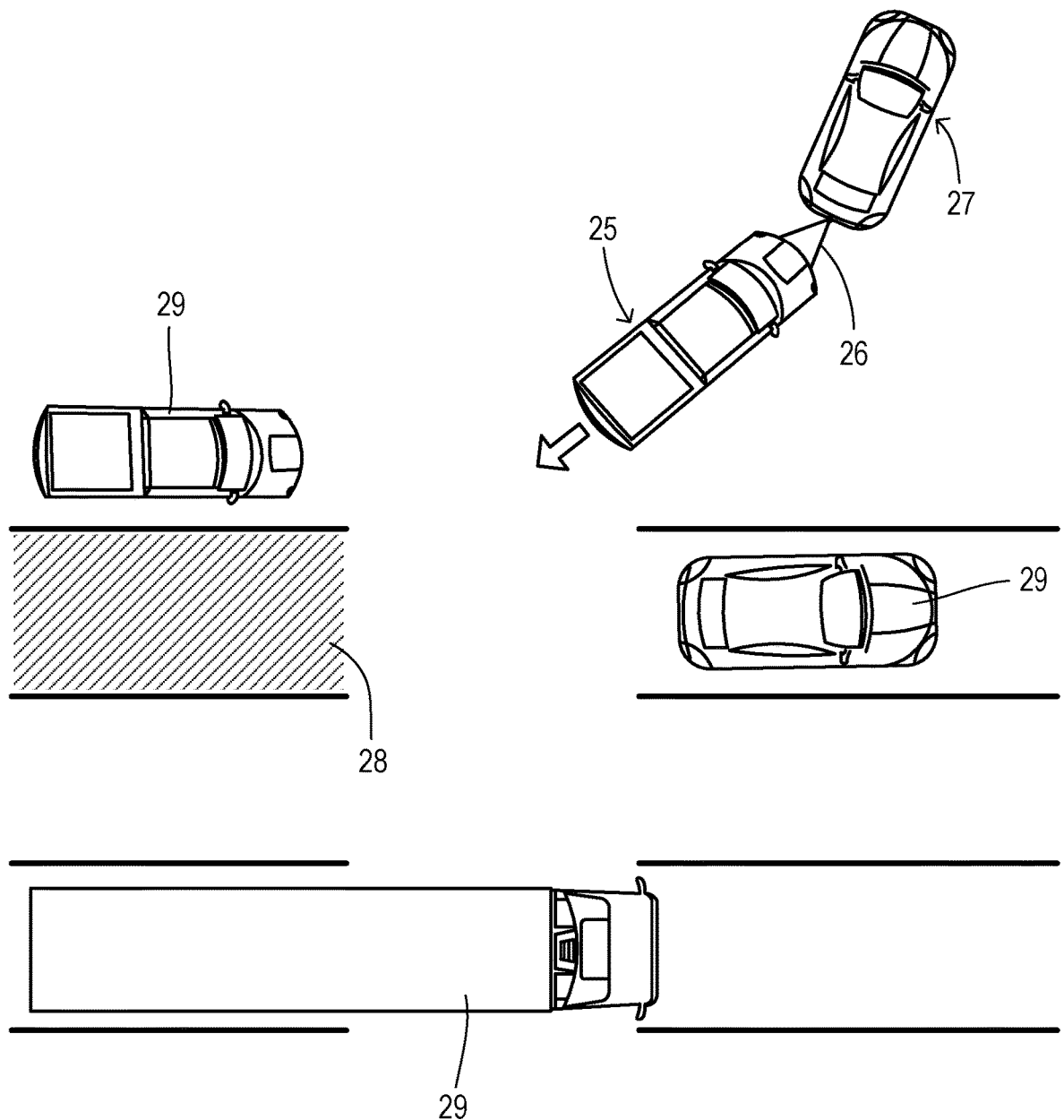
FIG. 2 is a diagram depicting an overhead view of a reverse parking maneuver for coupled vehicles into a desired parking space.

FIG. 2 shows a parking scenario in which a trailing vehicle 25, which is coupled by a towing device 26 to a leading vehicle 27, is to be reversed into a parking space 28. Nearby obstacles 29, such as cars, trucks, pedestrians, curbs, or walls, may increase the difficulty of the maneuvers necessary to navigate into space 28. The overhead view shown in FIG. 2 demonstrates the utility in conceptualizing and/or tracking a parking maneuver using such an overhead view.

Figure 3:
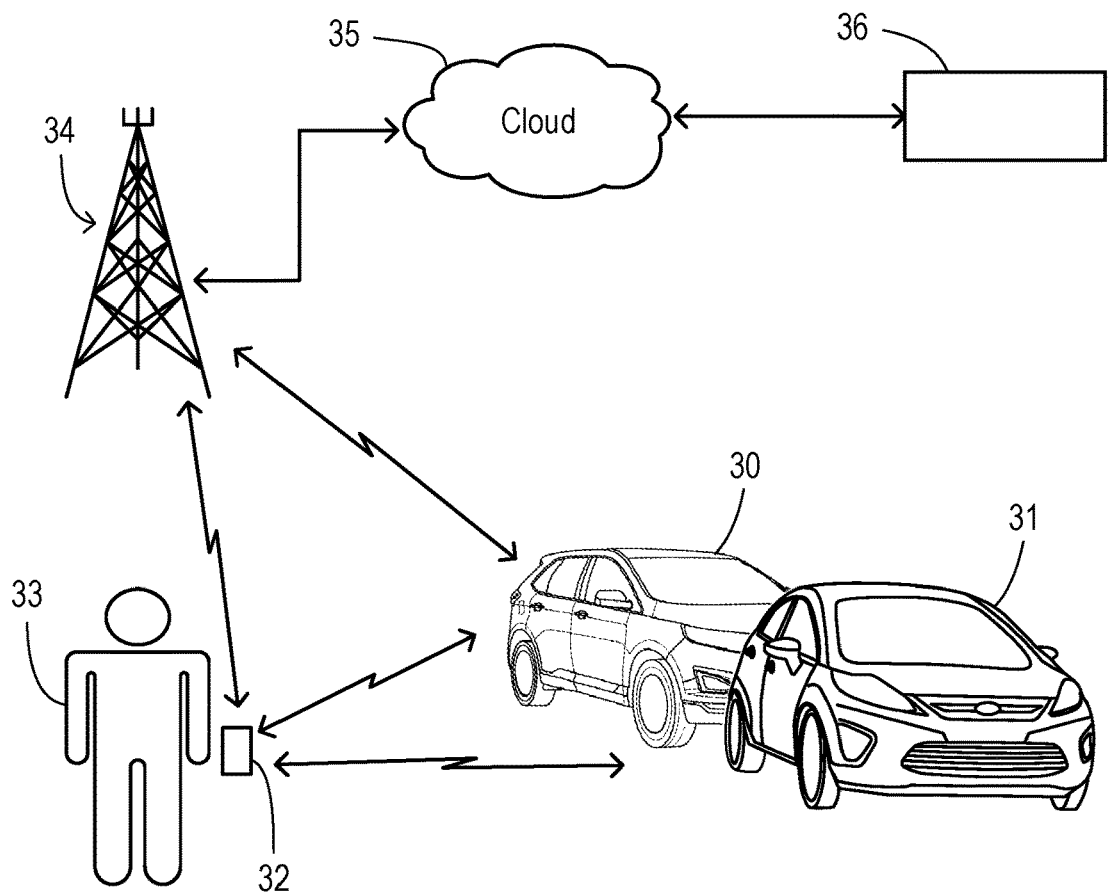
FIG. 3 is a diagram depicting communication links among a mobile device, coupled vehicles, and an in-flight charging management system.

FIG. 3 shows a remote-control parking system for vehicles coupled together for in-flight charging. A trailing vehicle 30 is coupled to a leading vehicle 31 for towing during an in-flight charging transaction. The coupling between vehicles 30 and 31 includes a digital communication link enabling various controllers in the vehicles to communicate with each other through a wired or a wireless media (a wireless link may be comprised of WiFi, V2V, Bluetooth® (BLE), or Ultra-Wideband (UWB), for example). The same or other wireless media is employed to further communicate with a wireless mobile device 32 (such as a smartphone or tablet) carried by a user 33. Mobile device 32 provides a user interface for remote control of vehicles 30 and 31. Mobile device 32 and electronic systems in vehicles 30 and 31 further communicate with a cellular phone system 34, which provides data communications with a cloud network 35 and a server system 36 which may be configured to manage an in-flight charging service. Communication with cloud network 35 may alternatively be provided via a DSRC or V2V infrastructure. The in-flight charging service could also be served from one of the vehicles to the other, with communication being achieved over BLE, UWB, or WiFi. The manner of coupling of mobile device 32 with the vehicles can be similar to the remote control systems disclosed in U.S. Pat. No. 10,747,218, issued Aug. 18, 2020, entitled "Mobile Device Tethering For Remote Parking Assist," and U.S. Pat. No. 10,976,733, issued Apr. 13, 2021, entitled "Interfaces For Remote Trailer Maneuver Assist," both of which are incorporated herein by reference in their entirety. In a known remote parking assist (RePA) system, for example, a vehicle controls its longitudinal and lateral movement in response to parking selections entered using a smartphone app. In a known remote trailer maneuver assist (ReTMA) system, for example, a user continuously inputs a desired path curvature for the trailer by dragging a trailer or vehicle icon on a touchscreen, turning a virtual knob, or rotating the smartphone orientation. The inputs are transmitted to a vehicle which controls its longitudinal and lateral movement to follow the curvature command. These prior systems involve simpler systems in which a single vehicle controls a maneuver.

Figure 4:
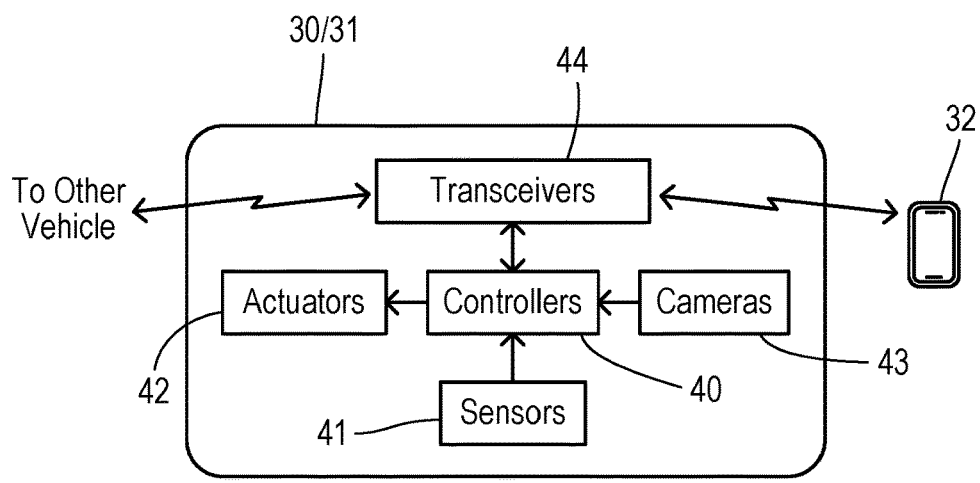
FIG. 4 is a block diagram showing vehicle components and a link to a mobile device.

FIG. 4 shows some components of vehicle 30 and/or 31 in greater detail. A controller or network of controllers 40 in the vehicle is coupled to a plurality of sensors 41 and a plurality of actuators 42. Additional sensors in the form of a plurality of cameras 43 is also provided. Cameras 43 are outward-looking in order to capture external images capable of being stitched (merged) together and transformed in order to provide a 360° overhead view of the vehicles and a surrounding region (e.g., potentially covering a diameter of about 100 feet). Transceivers 44 are coupled to controllers 40 to provide wireless links to mobile device 32, to other vehicles, and to a cloud network, for example. Sensors 41 may include ultrasonic obstacle sensors, radar, and/or LiDAR sensors to characterize surrounding objects, as well as user input sensors such as a steering wheel sensor, accelerator pedal position sensor, brake pedal position sensor, or gear shift lever position sensor in a drive-by-wire vehicle. Actuators 42 may include an electric power-assisted steering (EPAS) power steering motor in addition to powertrain control actuators such as a throttle control, brake control, or transmission control.

In some embodiments, known control systems in one or both vehicles are utilized to perform automatically controlled steering adjustments for enhanced reverse maneuvering controls during reverse parking maneuvers when connected together in an in-flight bi-directional charging configuration. The EPAS systems or other systems such as electronic stability control (ESC) systems may be used for obtaining steering inputs from a driver (e.g., from a steering angle and/or steering torque sensor). EPAS/ESC information for both vehicles can be shared with each other through a wired or a wireless communication link (a wireless link may be comprised of WiFi, V2V, or Bluetooth® (BLE), for example).

Control aspects of the present invention can be executed in one or more controllers located in either or both of the vehicles. In-flight charging functions and reverse maneuvering functions can be implemented using a dedicated control module, incorporated in an existing control module such as an electronic stability control (ESC) module, an electric power-assist steering (EPAS) module, a battery control module (BCM), or a powertrain control module (PCM), or can be distributed among these or other control modules. Typically, a first controller located in one of the vehicles is coupled to a second controller in the other one of the vehicles via the communication links. Tandem vehicles coupled together for inflight charging are capable of highly complex parking maneuvers. The controllers are configured to cooperatively initiate a reverse parking maneuver based on communication signals between the separate vehicle controllers and between the vehicle controllers and a user's mobile wireless device which provides a user interface that enables the user to harness the capability of complex coordinated maneuvering of the two vehicles using an uncomplicated remote control interface.

Figure 5:
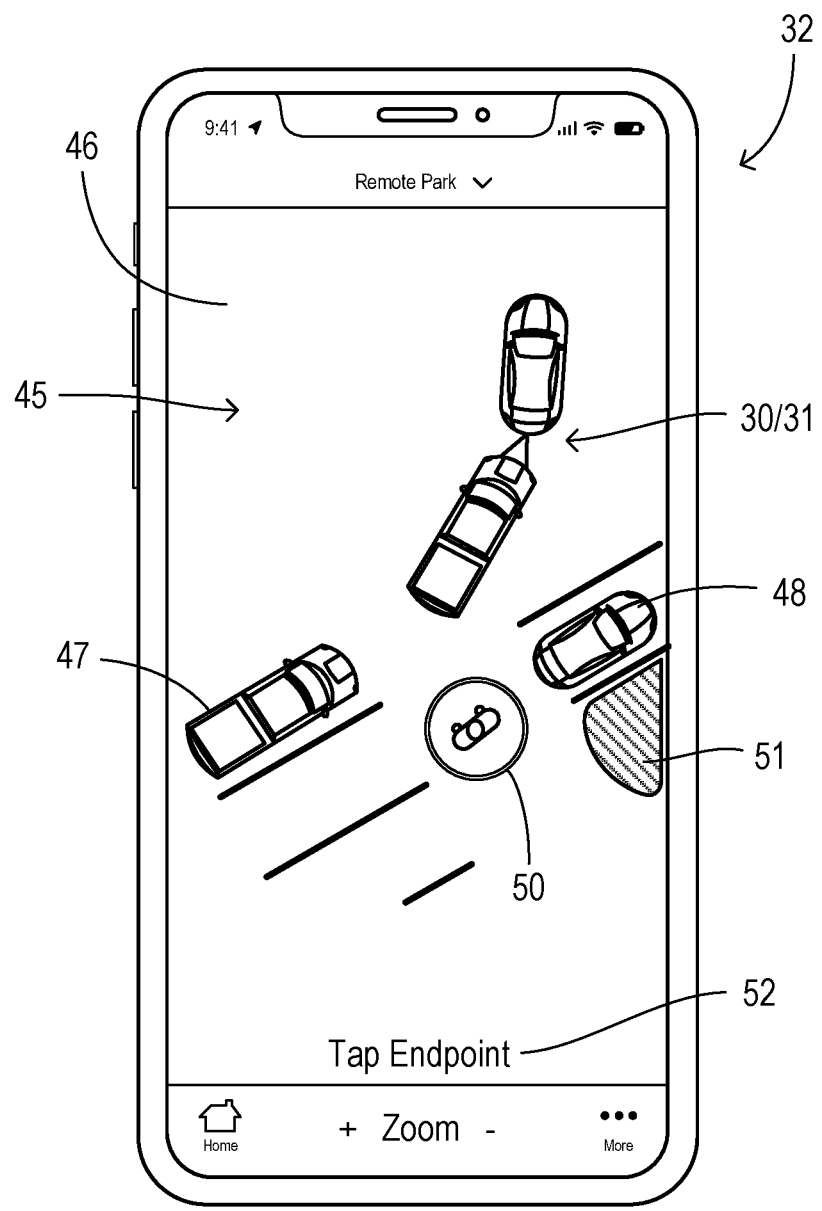
FIG. 5 depicts an interface using a mobile device such as a smartphone for displaying a composite, overhead image to a driver based on combined camera images from the leading and trailing vehicles.

For optimum performance, both vehicles are controlled in order to coordinate their motion when parking at a desired end position. Each vehicle may provide one or more of propulsion, braking, and steering direction when moving to the desired location. Initially, a user positions the coupled vehicles near the desired parking destination and then engages this automatic remote-controlled parking feature. Once activated, a controller app is launched which may execute on the user's mobile device (e.g., smartphone) and on vehicle controllers on one or both vehicles. Using images captured from multiple rear, side, and front cameras disposed on the vehicles, a 360° panoramic image is stitched together and then transformed into an overhead perspective. To reduce distortion, some elements of the overhead view such as the coupled vehicles may be replaced with predefined icons or images. The 360° overhead view is displayed as a live streaming image 45 on a touchscreen display 46 of smartphone 32 as shown in FIG. 5. Live streaming image 45 provides a clear perspective for a region around coupled vehicles 30/31, enabling the user to visualize the spatial relationship of the coupled vehicles to the desired endpoint of the parking maneuver and any obstacles such as nearby vehicles 47 and 48.

The user may typically operate the remote control function from a standing position outside coupled vehicles 30/31, and consequently would be visible in live streaming image 45. Pattern recognition, GPS tracking, or other known methods can be used to identify the user's image in live streaming image 45, and a corresponding user icon 50 is displayed on touchscreen 46 to indicate the detected position of the user in order to assist the user in orienting themselves in the scene. User icon 50 may be comprised of a circle or an altered coloration centered on the detected position of the user, for example. Overhead image 45 may be further enhanced to indicate the location and/or identity of obstacles using additional sensors disposed on vehicles 30/31, such as active sensors (e.g., ultrasonic or radar).

The coverage area of the merged overhead view preferably extends over a diameter of 50 feet or more in order to provide a meaningful view of the elements necessary to specify and monitor a parking maneuver. A range of the active sensors and/or an estimated distance scale of the displayed image may be provided on the display (not shown). A zoom control can be provided to allow the user to change image scale, and a zoomed image could be panned across touchscreen 46 using a finger drag. Some regions within the coverage area of the live overhead view may be hidden from view of the cameras by other objects such as vehicles, resulting in missing data. To differentiate from open areas, a missing data overlay 51 may be displayed over live streaming image 45 corresponding to the hidden regions.

Images of coupled vehicles 30/31 could also be enhanced to display a "virtual bumper" encircling both vehicles in tandem (e.g., a 30 cm boundary extension) for use in providing a buffer between the vehicles and surrounding obstacles when calculating and executing a parking maneuver. The use may be given the option to define a smaller or larger virtual bumper zone, which could be used to update the enhanced display.

Figure 6:
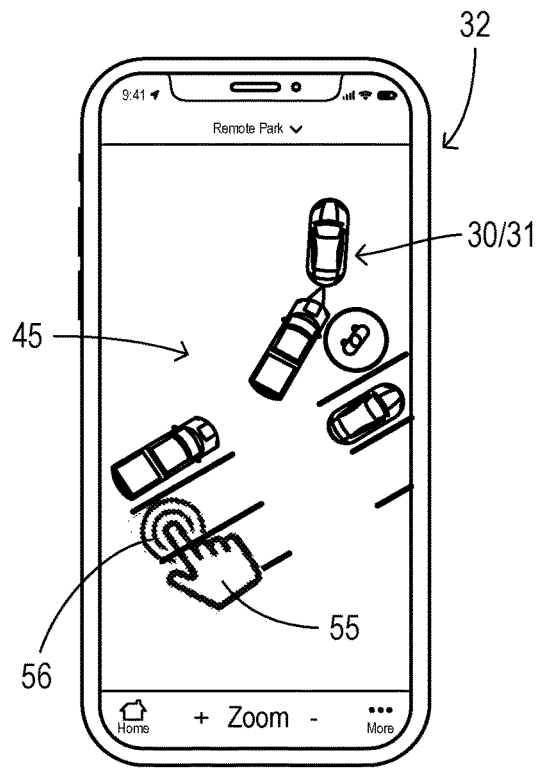
FIG. 6 depicts an interface selecting an endpoint for a desired reverse parking maneuver.

With the overhead streaming image presented to the user according to the user interface displayed on touchscreen 46, and with vehicles 30/31 stopped at a starting position for the parking maneuver (e.g., the user may be standing outside the vehicles), the user is prompted by the user interface to input a desired endpoint for the parking maneuver. For example, an instruction 52 is displayed to prompt the user to tap on live streaming image 45 at a location corresponding to the desired endpoint. As shown in FIG. 6, a user's finger 55 performs a manual touch input 56 at a desired endpoint. After a desired endpoint has been selected, its relative position with respect to the vehicles and the relative positions of all nearby obstacles are passed to the controllers within coupled vehicles 30/31 where at least one optimal path for moving vehicles 30/31 to the endpoint is calculated. The path may be defined according to a sequence of steering actions and associated vehicle speed (via throttle and braking actions) that displace the vehicles to the endpoint without impacting any obstacles or violating any buffer zones. In some embodiments, a machine learning module may be used to examine images and/or sensor data to determine a proposed endpoint, and/or may be used to plan the sequence of steering actions.

Figure 7:
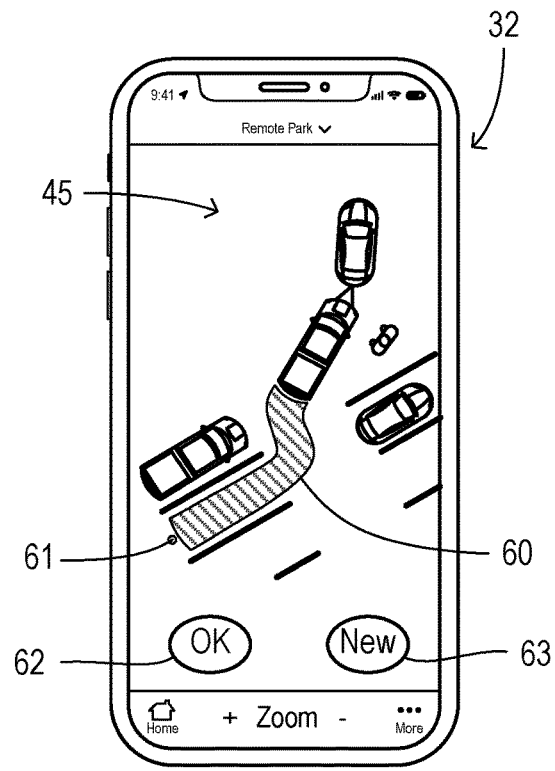
FIG. 7 depicts an interface for presenting a calculated path for the desired reverse parking maneuver.

Based on the calculated path(s), the user interface provides a visual confirmation by displaying the path as a path overlay 60 on live streaming image 45 as shown in FIG. 7. Path overlay 60 may be comprised of an added tint inside a solid perimeter line so that the scene is mostly unobscured. An endpoint icon 61 is also displayed, enabling the user to verify that it was entered as intended. An acceptance button 62 may optionally be displayed where the user may tap the touchscreen in order to indicate acceptance of the highlighted path in order to proceed. A redo button or new button 63 may be provided where the user may tap in the event that they desired to find a different path.

Figure 8:
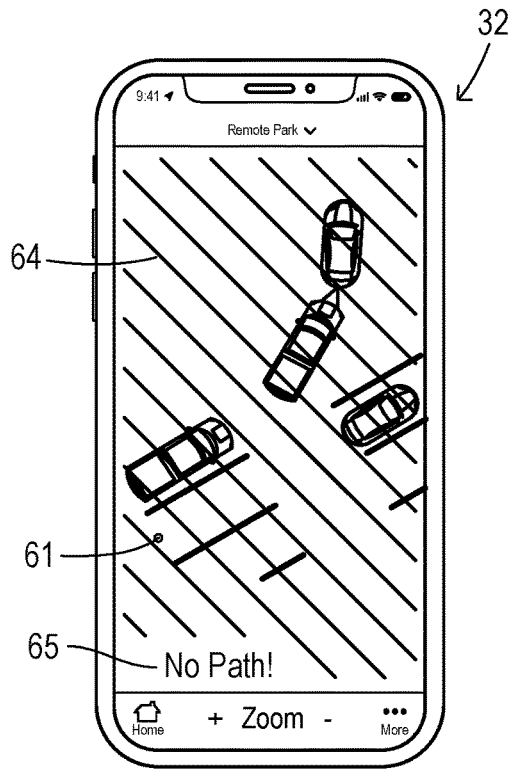
FIG. 8 depicts an interface for indicating failure to find an available path to the desired endpoint.

In some instances, algorithms calculating a path may determine that a valid path is not available (e.g., due to unavoidable impacts or regions of missing data). As shown in FIG. 8, the user interface may inform the user of the lack of a valid path from the starting location to the endpoint by providing an alert in the form of an added tint 64 (e.g., a red tint) across the touchscreen and/or a user message 65 indicating there is no path available. In such a situation, the user interface may return to a screen for receiving a manual touch input to indicate a different endpoint (FIG. 6) or the user may drive the vehicles to a new starting location to try again. When a failure is caused by missing data, the user may select an endpoint representing only part of the desired parking maneuver in order to move the vehicles to an intermediate point from which new camera images and other sensor data can be collected to supply some of the previously missing data.

Figure 9:
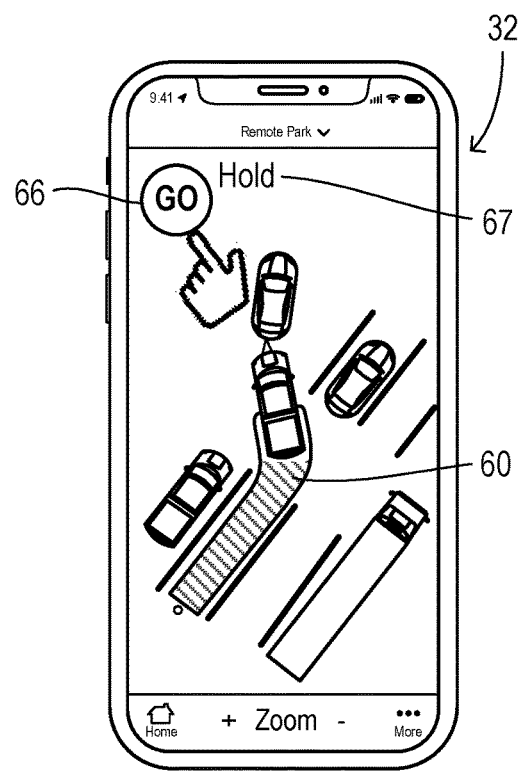
FIG. 9 depicts an interface for executing movement along an accepted path.

When an acceptable path has been selected, the user interface presents the user with an activation icon 66 to cause the path to be followed as shown in FIG. 9. A text legend 67 is associated with activation icon 66 to remind the user that vehicle movement will occur only as long as the user continues to hold their manual touch input at icon 66. Any time that the manual touch input on icon 66 is discontinued then the vehicles will cease movement (e.g., by application of the brakes). Movement may also be stopped if either vehicle detects it may impact something (e.g., if a person or car has moved into the calculated path).

In an alternative embodiment, path overlay 60 is used instead of a separate activation icon. Thus, the user's manual touch input can be directed to path overlay 60, with the vehicles moving on the path only while the user's finger remains in contact with path overlay 60. For example, the user may drag their finger along path overlay 60 from the starting location to the endpoint of the path and then continue to hold their finger on the screen (e.g., at the endpoint) to provide an activation signal that authorizes vehicle motion.

In either embodiment, while the user maintains their manual touch input then the user interface generates a manual activation signal which is transmitted to the vehicle controller(s). While receiving the manual activation signal, the vehicle controllers or controller network generate vehicle actuator commands for both vehicles in order to automatically navigate the vehicles along the calculated/selected path.

Figure 10:
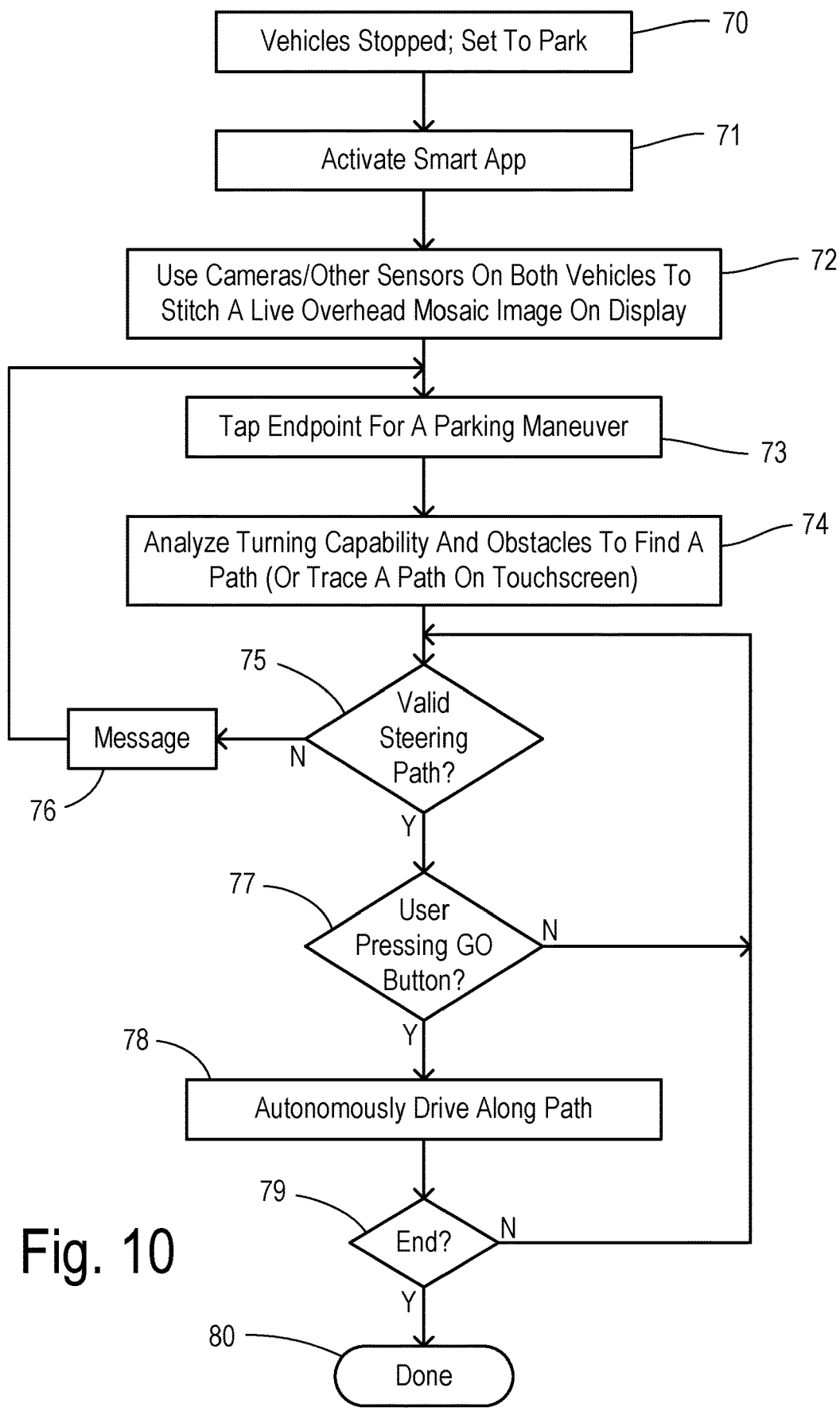
FIG. 10 is a flowchart showing one preferred method according to the invention.

FIG. 10 shows a preferred method of the invention where a leading vehicle and a trailing vehicle are stopped in a starting position ready to be parked into or out from a parking space in step 70 with their transmission gear selectors set to park. In step 71, a smart app is activated on a user's mobile device for performing a remote-controlled parking maneuver by using a user interface presented at least in part on a touchscreen of the mobile device to coordinate the parking operation together with a network of controllers in the vehicles. In step 72, cameras and other sensors disposed on the vehicles are used to stitch together a live overhead mosaic image which is displayed on the touchscreen display of the mobile device. In step 73, a user taps at a point on the touchscreen at which a corresponding location in the live overhead image corresponds to a desired destination (endpoint) for the parking maneuver. In step 74, the vehicle controllers analyze the turning capability of the vehicles and the presence of obstacles in order to find a path for the maneuver. In an alternate embodiment, a user may trace a desired parking path on the touchscreen and then the controllers can attempt to calculate matching steering controls to follow the traced path.

Based upon the selected endpoint and the resulting calculations, a check is performed in step 75 to determine whether a valid steering path is found from the starting location to the endpoint. If not, then the user interface provides a message or other alert to the user in step 76, and a return is made to step 73 in order to reselect an endpoint. If a valid steering path exists, then a check is performed in step 77 to determine whether the user is requesting motion along the path, e.g., by pressing an activation icon or other manual screen input. The invention uses an ongoing action of the user in order to indicate an authorization to proceed along the path. If the manual action (e.g., touch input) of the user is not present, then the method may cycle through step 75 and 77 while waiting for either an activation signal or a change in the parking situation. When the user is pressing the Go button in step 77, then the vehicles are autonomously driven along the calculated path in step 78 by following the sequence of steering actions which are generated by sending vehicle actuator commands from the vehicle controllers. In step 79, a check is performed to determine whether the end of the path has been reached. If not, then a return is made to step 75 in order to continue monitoring the path and the manual user activation signal and to retrieve additional vehicle actuator commands to follow the sequence of steering actions. Once the end is reached in step 79, then the method terminates at step 80.

During all above described maneuvers, the charging event may be suspended if either vehicle's crash avoidance system detects a possible collision may occur and then re-activated when the warning has subsided. It may also terminate charging if either vehicle's collision system initiates an air bag or fuel cutoff.

What is claimed is:

1. A remote-controlled vehicle interface system, comprising:
   a vehicle controller configured to (1) collect a plurality of captured images from a plurality of cameras disposed in a pair of electrified vehicles coupled together by a towing device for in-flight energy transfer wherein electrical energy is supplied from a battery pack of one of the electrified vehicles to a battery pack in the other one of the electrified vehicles, wherein each electrified vehicle is adapted to perform independent propulsion, braking, and steering actions, (2) calculate a sequence of steering actions to be executed by both electrified vehicles to follow a path for maneuvering from a starting position to an endpoint, and (3) generate respective vehicle actuator commands for both electrified vehicles to automatically navigate the electrified vehicles along the path in response to a manual activation signal from a user; and
   a mobile wireless device linked wirelessly to the vehicle controller and including a touchscreen display for presenting a user interface to the user, wherein the user interface comprises:
   (A) displaying a live streaming image on the touchscreen display having a 360° overhead perspective of a region around the electrified vehicles;
   (B) accepting a first manual touch input from the user on the live streaming image while the electrified vehicles are at the starting position in order to specify the endpoint;
   (C) displaying the path calculated by the vehicle controller as a path overlay on the live streaming image; and
   (D) generating the manual activation signal in response to a second manual touch input from the user on the touchscreen display and forwarding the manual activation signal to the vehicle controller only during the second manual touch input in order to move the electrified vehicles according to the vehicle actuator commands to be performed by both electrified vehicles while the user maintains the second manual touch input.

2. The system of claim 1 wherein the user interface further comprises displaying an activation icon indicating an area on the touchscreen display for receiving the second manual touch input.

3. The system of claim 1 wherein the user interface further comprises accepting the second manual touch input at an area on the touchscreen display corresponding to the path overlay.

4. The system of claim 1 wherein the user interface further comprises displaying a user icon on the touchscreen display indicating a detected position of the user in the live streaming image.

5. The system of claim 1 wherein the user interface further comprises displaying a missing data overlay on the live streaming image corresponding to regions within a predetermined distance of the electrified vehicles which are hidden in the plurality of captured images.

6. The system of claim 1 wherein the user interface further comprises an alert to the user when the vehicle controller fails to calculate the sequence of steering actions to be executed by both electrified vehicles to maneuver from the starting position to the endpoint.

7. The system of claim 1 wherein the path from the starting position to the endpoint is along a reverse driving direction of the electrified vehicles.

8. The system of claim 1 wherein the path from the starting position to the endpoint is along a forward driving direction of the electrified vehicles.

9. An in-flight vehicle charging system wherein electrical energy is transferred between two electrified vehicles moving together as a unit, wherein each electrified vehicle is adapted to perform independent propulsion, braking, and steering actions, comprising:
- a first electrified vehicle comprising 1) a first controller adapted to be coupled to a second controller in a second electrified vehicle via a communication link, 2) an electrically-controlled steering actuator responsive to a sequence of steering actions from the first controller for a parking maneuver from a starting position to an endpoint, 3) a plurality of cameras collecting a plurality of captured images of surroundings of the first and second vehicles, 4) a rechargeable battery system configured to store electrical energy used to provide propulsion of the first electrified vehicle, wherein the rechargeable battery system is adapted to exchange electrical energy with a second vehicle which is coupled to the first electrified vehicle in a towing relationship; and
- a user interface configured to execute on a mobile wireless device linked wirelessly to the first controller and including a touchscreen display for presenting the user interface to the user;
- wherein the user interface comprises:
  - (A) displaying a live streaming image on the touchscreen display using the captured images, wherein the live streaming image has a 360° overhead perspective of a region around the first and second electrified vehicles;
  - (B) accepting a first manual touch input from a user on the live streaming image while the first and second vehicles are at the starting position in order to specify the endpoint;
  - (C) displaying a calculated path from the starting position to the endpoint as calculated by the first controller using a path overlay on the live streaming image; and
  - (D) generating a manual activation signal in response to a second manual touch input from the user on the touchscreen display and forwarding the manual activation signal to the first controller only during the second manual touch input in order to move the vehicles according to the sequence of respective steering actions to be performed by both electrified vehicles while the user maintains the second manual touch input.

10. The system of claim 9 wherein the user interface further comprises displaying an activation icon indicating an area on the touchscreen display for receiving the second manual touch input.

11. The system of claim 9 wherein the user interface further comprises accepting the second manual touch input at an area on the touchscreen display corresponding to the path overlay.

12. The system of claim 9 wherein the user interface further comprises displaying a user icon on the touchscreen display indicating a detected position of the user in the live streaming image.

13. The system of claim 9 wherein the user interface further comprises displaying a missing data overlay on the live streaming image corresponding to regions within a predetermined distance of the vehicles which are hidden in the plurality of captured images.

14. The system of claim 9 wherein the user interface further comprises an alert to the user when the first controller fails to calculate the sequence of steering actions to be executed by both vehicles to maneuver from the starting position to the endpoint.

15. A method of controlling first and second electrified vehicles coupled together in a towing arrangement for in-flight transfer of a charge between battery systems of the vehicles wherein electrical energy is supplied from a battery pack of one of the electrified vehicles to a battery pack in the other one of the electrified vehicles, the method comprising the steps of:
- collecting a plurality of captured images from a plurality of cameras disposed in the electrified vehicles;
- combining the captured images into a live streaming image having a 360° overhead perspective of a region around the electrified vehicles;
- displaying the live streaming image on a touchscreen display of a wireless mobile device carried by a user;
- receiving a first manual touch input from the user on the touchscreen display at a location on the live streaming image while the electrified vehicles are at a starting position for conducting a parking maneuver in order to specify an endpoint for the parking maneuver;
- calculating a sequence of respective steering actions to be executed by both electrified vehicles according to a path for maneuvering from the starting position to the endpoint;
- displaying the path as a path overlay on the live streaming image;
- generating a manual activation signal in response to a second manual touch input from the user on the touchscreen display only during the second manual touch input;
- generating vehicle actuator commands for both electrified vehicles to automatically navigate the electrified vehicles along the path in response to the manual activation signal; and
- stopping the vehicle actuator commands when the manual activation signal is not present and when the endpoint is reached.

16. The method of claim 15 further comprising the step of displaying an activation icon indicating an area on the touchscreen display for receiving the second manual touch input.

17. The method of claim 15 further comprising the step of accepting the second manual touch input at an area on the touchscreen display corresponding to the path overlay.

18. The method of claim 15 further comprising the step of displaying a user icon on the touchscreen display indicating a detected position of the user in the live streaming image.

19. The method of claim 15 further comprising the step of displaying a missing data overlay on the live streaming image corresponding to regions within a predetermined distance of the electrified vehicles which are hidden in the plurality of captured images.

20. The method of claim 15 further comprising the step of alerting the user when there is a failure to calculate a valid sequence of steering actions to be executed by both electrified vehicles to maneuver from the starting position to the endpoint.

* * * * *